United States Patent
Fuh et al.

(10) Patent No.: US 10,636,178 B2
(45) Date of Patent: Apr. 28, 2020

(54) SYSTEM AND METHOD FOR CODING AND DECODING OF AN ASSET HAVING TRANSPARENCY

(71) Applicant: TINY PIXELS TECHNOLOGIES INC., Vancouver (CA)

(72) Inventors: Hsiehyu Fuh, Palo Alto, CA (US); June Yan Lin Chen, Richmond (CA)

(73) Assignee: TINY PIXELS TECHNOLOGIES INC., Vancouver (CA)

( * ) Notice: Subject to any disclaimer, the term of this patent is extended or adjusted under 35 U.S.C. 154(b) by 43 days.

(21) Appl. No.: 16/133,880

(22) Filed: Sep. 18, 2018

(65) Prior Publication Data

US 2019/0087981 A1 Mar. 21, 2019

Related U.S. Application Data (60) Provisional application No. 62/561,406, filed on Sep. 21, 2017.

(51) Int. Cl.
| | |
|---|---|
| *G06T 11/00* | (2006.01) |
| *G06K 9/00* | (2006.01) |
| *H04N 19/21* | (2014.01) |
| *H04N 19/00* | (2014.01) |

(52) U.S. Cl.
CPC ........ *G06T 11/001* (2013.01); *G06K 9/00718* (2013.01); *H04N 19/00* (2013.01); *H04N 19/21* (2014.11)

(58) Field of Classification Search
CPC ................ G06T 7/90; G06T 11/001
See application file for complete search history.

(56) References Cited

U.S. PATENT DOCUMENTS

| | | | | |
|---|---|---|---|---|
| 2014/0150013 | A1* | 5/2014 | Fauqueur | H04N 21/23412 725/32 |
| 2015/0244987 | A1* | 8/2015 | Delegue | H04N 7/157 348/14.09 |
| 2018/0278903 | A1* | 9/2018 | Iwadate | H04N 9/3182 |
| 2019/0149792 | A1* | 5/2019 | Luo | G06F 3/14 |

* cited by examiner

*Primary Examiner* — Phi Hoang
(74) *Attorney, Agent, or Firm* — Bhole IP Law; Anil Bhole; Marc Lampert (57) ABSTRACT

A system and method for coding and decoding of an asset having transparency. The method for coding of an asset includes: receiving the asset; obtaining a frame image for each frame in the asset, the frame image having an integer value for each of a red channel, a green channel, a blue channel, and a transparent channel; generating a first sub-image and a second sub-image from each frame image, the first sub-image including a mask derived from the transparent channel, the second sub-image including a red channel, a green channel, and a blue channel derived from the red channel, the green channel, and the blue channel of the frame image respectively; placing the first sub-image in proximity to the second sub-image; and generating a combined asset including a series of combined frames, each combined frame including the first first sub-image in proximity to the second sub-image.

17 Claims, 7 Drawing Sheets

SYSTEM AND METHOD FOR CODING AND DECODING OF AN ASSET HAVING TRANSPARENCY

TECHNICAL FIELD

The following relates generally to video processing, and more specifically, to a system and method for coding and decoding of an asset having transparency.

BACKGROUND

Playback of video content over the internet or other networks, whether streamed or downloaded, has become ubiquitous.

Generally, videos, including online streaming videos, are opaque; meaning that the video is a rectangular block of fully opaque pixels such that there cannot be areas of transparency within the video frame. Accordingly, such videos typically do not support transparency where portions of the video frame are transparent.

Accordingly, systems processing such videos typically cannot insert, such as via overlay, dynamic assets that have transparency into a source video and maintain such transparency.

It is therefore an object of the present invention to provide a system and method in which the above disadvantages are obviated or mitigated and attainment of various advantages is facilitated.

SUMMARY

In an aspect, there is provided a method for coding of an input asset, the input asset having at least one area comprising a transparency, the input asset comprising one or more sequential frames, the method executed on at least one processing unit, the method comprising: receiving the input asset; obtaining a frame image for each frame in the input asset, the frame image having a value for each of a red channel, a green channel, a blue channel, and a transparent channel; generating a first sub-image and a second sub-image from each frame image, the first sub-image comprising a mask generated from the transparent channel, the second sub-image comprising a red channel, a green channel, and a blue channel generated from the red channel, the green channel, and the blue channel of the frame image respectively; associating the first sub-image with the second sub-image; and generating a combined asset comprising one or more sequential combined frames, each combined frame comprising the first sub-image in association with the second sub-image.

In a particular case, the associating the first sub-image with the second sub-image comprises placing the first sub-image in proximity to the second sub-image.

In another case, the first sub-image is generated by assigning, for each pixel, the value for such pixel in the transparent channel to the value for a respective pixel in at least one of the red channel, green channel, and blue channel of the mask.

In yet another case, the value of each channel for each pixel in the mask ranges from zero to a maximum value, where zero represents full transparency and the maximum value represents no transparency.

In yet another case, placing the first sub-image in proximity to the second sub-image comprises stacking the first sub-image adjacently above the second sub-image, the width of the combined frame being equal to a width of the first sub-image and the height of the combined frame being equal to twice a height of the first sub-image.

In yet another case, each frame in the input asset comprises an associated duration, the method further comprising associating a duration for each combined frame equivalent to the duration associated with the respective frame in the input asset.

In yet another case, the method further comprising decoding of the combined asset, the decoding comprising: generating one or more sequential first portions and one or more sequential second portions by splitting each combined frame, the first portion comprising substantially the first sub-image, the second portion comprising substantially the second sub-image; generating one or more sequential output frames in an output asset by: for each frame, assigning a value for a red channel, a green channel, and a blue channel for each pixel of the output asset frame with the value of the red channel, the green channel, and the blue channel of the respective pixel in the first portion respectively; and for each frame, assigning a value for a transparent channel for each pixel of the output asset frame with the value of a respective pixel in the second portion.

In yet another case, the value of the transparent channel in the output asset is assigned the value of any one of the red channel, the green channel, and the blue channel in the combined frame that was assigned the value of the transparent channel of the frame image.

In yet another case, each combined frame comprises an associated duration, the method further comprising associating a duration for each frame of the output asset equivalent to the duration associated with the respective combined frame.

In yet another case, the method further comprising overlaying the combined asset over a source media, the source media comprising one or more sequential frames, by: generating a first element comprising the source media; generating a hidden second element comprising the combined asset; generating a canvas element, pixels of the canvas element are transparent as default; placing the transparent canvas element over the first element; for each frame of the first video element, for each pixel in the second element, determining a value for a corresponding pixel in the canvas element as a combination of channel values of the corresponding pixel in the second sub-image and mask value of the corresponding pixel in the first sub-image; and synchronizing playback of the second video element with the first video element.

In yet another case, the method further comprising generating a size-adjusted combined asset from the combined asset, by: for each red, green, and blue channel in each pixel in each frame of the combined asset, determining a value for a corresponding channel of a corresponding pixel of a corresponding frame of the size-adjusted combined asset as a combination of the value from the input asset, the first sub-image and the second sub-image.

In yet another case, the combination is determined as the value from the first sub-image divided by the maximum channel value, multiplied by the value from the second sub-image, and added to the value from the input asset.

In another aspect, there is provided a method for decoding of a combined asset, the combined asset comprising one or more sequential combined frames, each combined frame comprising a first sub-image in proximity to a second sub-image, the method executed on at least one processing unit, the method comprising: receiving the combined asset; generating one or more sequential first portions and one or more sequential second portions by splitting each combined frame, the first portion comprising substantially the first sub-image, the second portion comprising substantially the second sub-image; and generating one or more sequential output frames in an output asset by: for each frame, assigning a value for a red channel, a green channel, and a blue channel for each pixel of the output asset frame with a value of the red channel, the green channel, and the blue channel of a respective pixel in the first portion respectively; and for each frame, assigning a value for a transparent channel for each pixel of the output asset frame with a value of a respective pixel in the second portion.

In a particular case, the value of the transparent channel in the output asset is assigned the value of any one of a red channel, a green channel, and a blue channel in the combined frame that was assigned a value of the transparent channel of a frame image of an asset coded into the combined asset.

In another case, each frame in the combined asset comprises an associated duration, the method further comprising associating a duration for each frame of the output asset equivalent to the duration associated with the respective combined frame.

In another aspect, there is provided a system for coding of an input asset, the input asset having at least one area comprising a transparency, the asset comprising one or more sequential frames, the system comprising at least one processing unit and a data storage, the at least one processing unit in communication with the data storage and configured to execute: an obtainment module to receive the input asset, and obtain a frame image for each frame in the input asset, the frame image having a value for each of a red channel, a green channel, a blue channel, and a transparent channel; a coding module to generate a first sub-image and a second sub-image from each frame image, the first sub-image comprising a mask generated from the transparent channel, the second sub-image comprising a red channel, a green channel, and a blue channel generated from the red channel, the green channel, and the blue channel of the frame image respectively, and associate the first sub-image with the second sub-image; and a compiler module to generate a combined asset comprising one or more sequential combined frames, each combined frame comprising the first sub-image associated with the second sub-image.

In another case, the first sub-image is associated with the second sub-image by placing the first sub-image in proximity to the second sub-image.

In yet another case, the first sub-image is generated by assigning, for each pixel, the value for such pixel in the transparent channel to the value for a respective pixel in at least one of the red channel, green channel, and blue channel of the mask.

In yet another case, the system further comprising a decoding module to decode the combined asset, by: generating one or more sequential first portions and one or more sequential second portions by splitting each combined frame, the first portion comprising substantially the first sub-image, the second portion comprising substantially the second sub-image; generating one or more sequential output frames in an output asset by: for each frame, assigning a value for a red channel, a green channel, and a blue channel for each pixel of the output asset frame with the value of the red channel, the green channel, and the blue channel of the respective pixel in the first portion respectively; and for each frame, assigning a value for a transparent channel for each pixel of the output asset frame with the value of a respective pixel in the second portion.

In yet another case, the method further comprising a compiler module to overlay the combined asset over a source media, the source media comprising one or more sequential frames, by: generating a first element comprising the source media; generating a hidden second element comprising the combined asset; generating a canvas element, pixels of the canvas element are transparent as default; placing the transparent canvas element over the first element; synchronizing playback of the second video element with the first video element; and for each frame of the first video element, for each pixel in the second element, determining a value for a corresponding pixel in the canvas element as a combination of channel values of the corresponding pixel in the second sub-image and mask value of the corresponding pixel in the first sub-image.

BRIEF DESCRIPTION OF THE DRAWINGS

The features of the invention will become more apparent in the following detailed description in which reference is made to the appended drawings wherein.

DETAILED DESCRIPTION

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following disclosure relates generally to video processing; and more specifically, to a system and method for coding and decoding of an asset having transparency.

It is understood that an "asset", as generally used herein, includes a video or dynamic image (with or without transparency); but can also include any suitable media component, data, file, coded page, or element. As an example, an asset can also be an image file (comprising a single frame), a coded page (such as an HTML file, and associated files like other images, CSS markup, etc.), or the like.

Generally, streaming videos do not support transparency. As such, a problem arises when a dynamic asset, having transparency, is desired to be overlaid on a source video comprising an opaque field or frames.

It has become common to place additional static or dynamic graphical elements over displayed video content (called the "source video"). Such additional elements being referred to as insertion of an "overlay" or "asset". Such additional elements may present advertising or other information, such as subtitling or timely alerts, whether or not related to the content.

If two videos are required to be overlaid, or otherwise inserted, some approaches use one of: chroma keying (green screen video), where an actor is recorded in front of a green screen as a single video, and on composition, all the green pixels are selectively removed making them transparent; limiting overlays to picture-in-picture, such that the overlaid asset is processed as a smaller opaque video on top of the base opaque video; limiting the overlaid asset to one or more transparent images on the opaque video; or manually generating, via video editing software, combined videos for each possible transparent asset and opaque video combination.

In many approaches, if a video asset having transparency is desired to be overlaid onto an opaque source video, both video layers (the video asset and source video) have to be combined into a new opaque video during content creation via video editing software. These approaches can be problematic because, given 'N' opaque source videos and 'M' transparent video assets, the system has to generate N*M copies of new combined opaque videos to account for all possibilities. As described below, the embodiments described herein can advantageously freely combine N+M copies to account for the various possibilities.

In many approaches, if chroma key techniques are used, the system cannot distinguish between the key color (green or blue) from background or content. Therefore, the resulting transparent video cannot contain such key color. Advantageously, the embodiments described herein can produce transparent combined videos without such limitations on colors being used.

Applicant has recognized the substantial advantages of the embodiments described herein. As an example, the embodiments described herein can allow both the asset and the source video to be its own stream; and in some cases, allow for combination at a client-side or user computing device (for example, in the user's browser). As another example, the embodiments described herein can allow for the overlay of dynamic asset content (for example, advertisements or ticker tapes) on top of pre-recorded source video content.

Figure 1:
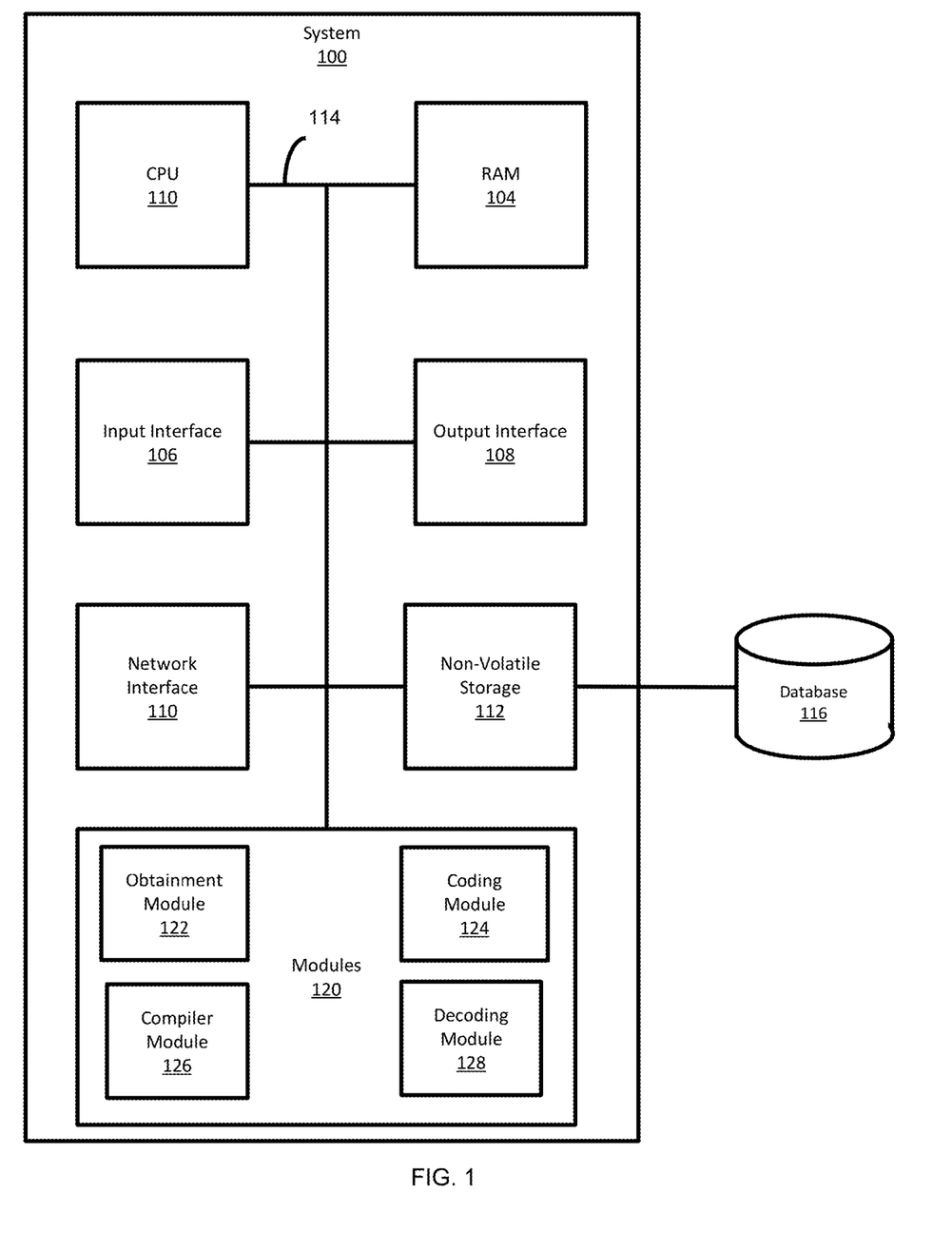
FIG. 1 is a schematic diagram of a system for insertion of one or more assets into a source video, in accordance with an embodiment.

Referring now to FIG. 1, a system 100 for coding and decoding of an asset having transparency, in accordance with an embodiment, is shown. In this embodiment, the system 100 is run on a client side device (26 in FIG. 2). In further embodiments, the system 100 can be run on any other computing device; for example, a desktop computer, a laptop computer, a smartphone, a tablet computer, a point-of-sale ("PoS") device, a server, a smartwatch, or the like. In this case, the system 100 is run on the client side device (26 in FIG. 2) and accesses content located on a server (32 in FIG. 2) over a network, such as the internet (24 in FIG. 2).

Figure 2:
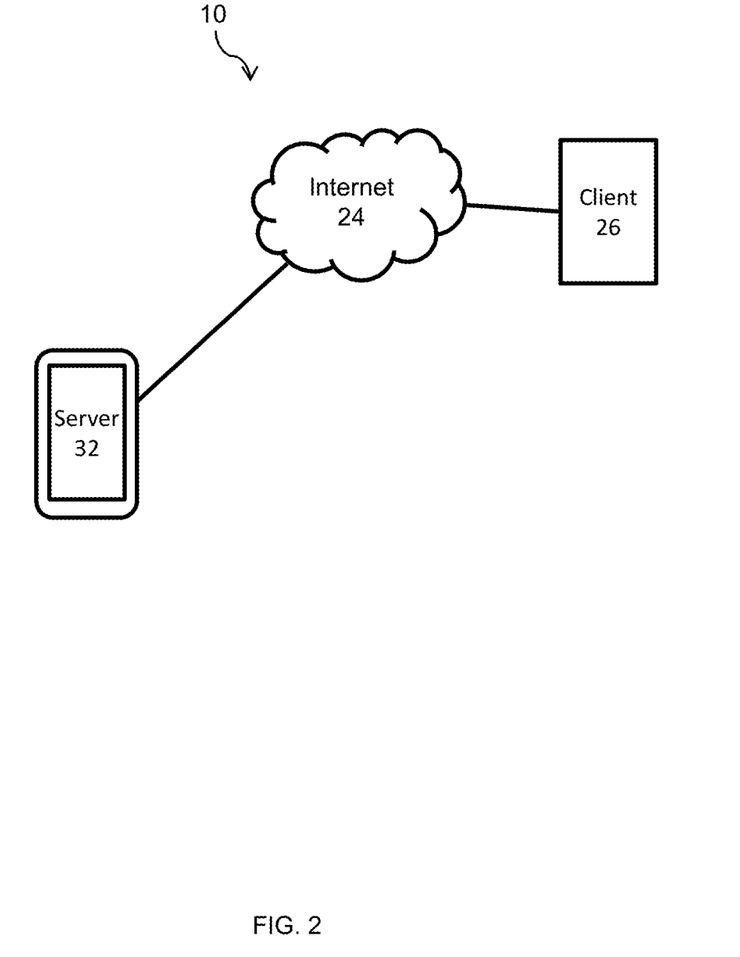
FIG. 2 is a schematic diagram showing the system of FIG. 1 and an exemplary operating environment.

FIG. 1 shows various physical and logical components of an embodiment of the system 100. In a particular case, the system 100 can be a client-side computing device 26 (as shown in FIG. 2). As shown, the system 100 has a number of physical and logical components, including a central processing unit ("CPU") 102, random access memory ("RAM") 104, the input interface 106, an output interface 108, a network interface 110, non-volatile storage 112, and a local bus 114 enabling CPU 102 to communicate with the other components. CPU 102 executes an operating system, and various modules 120, as described below in greater detail. RAM 104 provides relatively responsive volatile storage to CPU 102. The input interface 106 enables an administrator or user to provide input via an input device, for example a keyboard and mouse. The output interface 108 outputs information to output devices, such as a display and/or speakers. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in a database 116. During operation of the system 100, the operating system, the modules, and the related data may be retrieved from the non-volatile storage 112 and placed in RAM 104 to facilitate execution. In various embodiments, the system 100 comprises a web accessible API, such as a REST API, for facilitating access by the user at the client device to server functionality, including accessing various contents stored thereon. The job queue created in the API server can be handled by the CPU or distributed, for example among scalable on-demand GPU cloud computing servers. In other embodiments, the system 100 can comprise solely a local computing device.

In an embodiment, as described in more detail in the following, the system 100 includes various modules 120; including an obtainment module 122, a coding module 124, a compiler module 126, and a decoding module 128. In some cases, some or all of the various modules 120 can be executed on a server-side device 32 or a client-side device 26, and be in communication with the other modules.

In some cases, as shown in a diagram of a computing environment 10 in FIG. 2, the system 100 can communicate with, and retrieve data from, other computing devices; for example, from the server 32 to the client computing device 26. The system 100 can communicate with these devices over a data communication network; for example, the Internet 24.

Figure 3:
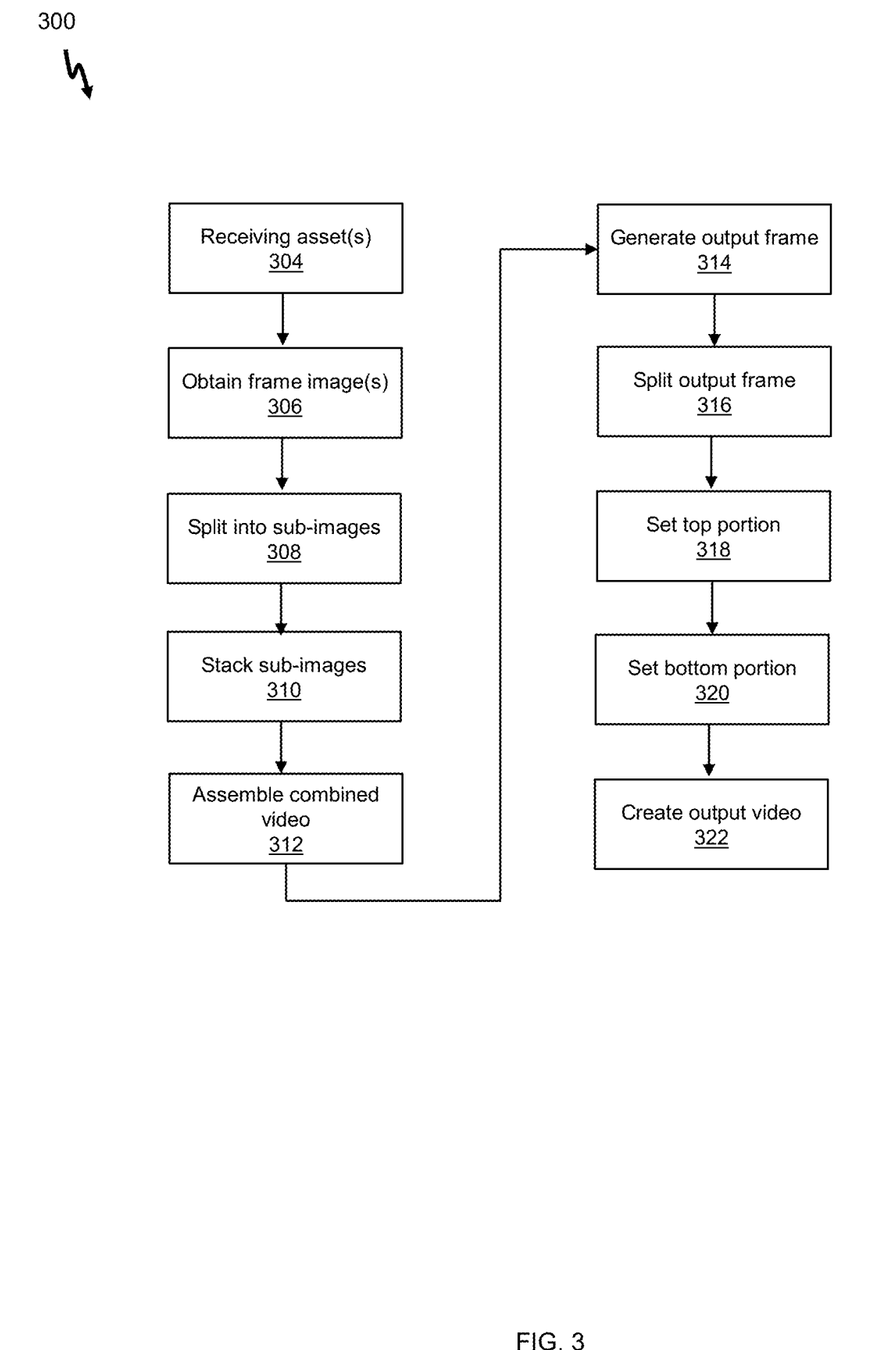
FIG. 3 is a flow chart of a method for insertion of one or more assets into a source video, in accordance with an embodiment.

Referring to FIG. 3, a method 300 for coding and decoding of an asset having transparency, in accordance with an embodiment, is shown.

At block 304, the obtainment module 122 receives an asset (also called an "input asset"); for example, a video or dynamic image. The asset includes transparent areas or aspects. In some cases, a source video is also received by the obtainment module 122. The asset may comprise one or more sequential frames.

At block 306, for each frame of the asset, the obtainment module 122 obtains a frame image with the following channels: red, green, blue and transparent. In this format, each channel can be an integer in the range of, for example, 0 to 255. Each integer represents the intensity of the channel color for that pixel.

At block 308, the coding module 124 splits each frame image into two sub-images; each of the sub-images can be identically sized to the frame image.

The first of the sub-images is a "mask image". The mask image comprises three channels: red, green, and blue (RGB). The pixel-by-pixel values for each channel in the mask image are derived from the pixel-by-pixel values of the transparent channel of the frame image. Visually, this yields a grayscale image, whereby a pixel is fully black ('0, 0, 0' RGB value) when fully transparent, and a pixel is fully white ('255, 255, 255' RGB value) when fully opaque. In further embodiments, only one or more of the RGB channels can have the value of the alpha channel; in this case, the decoder (as described herein) only inspects those channels for generating the transparent channel of the compiled image/frame.

The second of the sub-images is a "content image" (also called an "opaque frame"). The content image comprises three channels: red, green, and blue (RGB). The values for each channel in the content image are obtained from the values of the corresponding channel of the corresponding pixel of the frame image.

At block 310, the coding module 124 places the two sub-images such that the first sub-image is adjacent to the second sub-image. In an embodiment, the two sub-images are placed vertically into a combined image having the same width and twice the height of the corresponding frame image (as exemplified in FIG. 5B). Adjacent placing of the sub-images allows the system 100 to carry the transparency alpha channel data separately from the source video frame into an opaque video frame. In some cases, the mask image may be stacked on top of the content image; and in other cases, the content image may be stacked higher than the mask image. In other embodiments, the two sub-images can have any appropriate orientation and need not be necessarily adjacent as long as the decoding module 128 can decode the placement of each of the sub-images (as described below); for example, side-by-side orientation or in proximity with one another.

At block 312, for each frame image of the asset, the compiler module 126 assembles a combined asset using the same timeline as the asset. Accordingly, each frame in the input asset can have an associated duration, and each frame in the combined asset can have an associated duration equivalent to the associated duration of the respective frame in the input asset. Each frame of the combined asset includes the adjacently placed content image and mask image for each respective frame of the asset. The combined asset has three channels: red, green, and blue.

Figure 4:
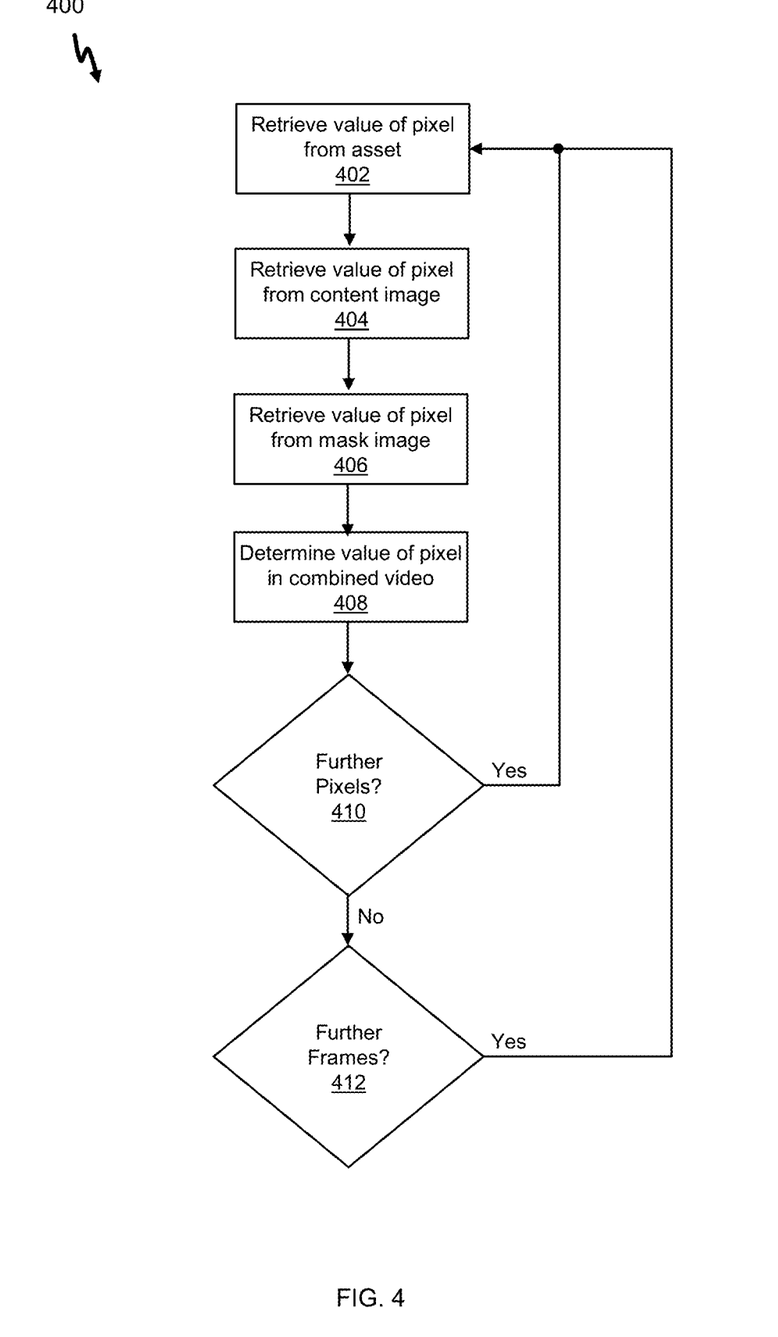
FIG. 4 is a flow chart of an exemplary method of assembling a combined asset, according to the system of FIG. 1.

In an exemplary implementation of block 312, the compiler module 126 can execute the method 400, shown in the flowchart of FIG. 4, to assemble a size-adjusted combined asset. The size-adjusted combined asset can have the same width and height as the asset (also called the "input asset"), and can have three channels: red, green, and blue. At block 402, for a first pixel of a first frame, the compiler module 126 retrieves the value of a corresponding pixel from a corresponding frame of the asset (designated as "Pixel_Value_A"). At block 404, the compiler module 126 retrieves the value of a corresponding pixel from a corresponding frame of the content image (designated as "Pixel_Value_C"). At block 406, the compiler module 126 retrieves the value of a corresponding pixel from a corresponding frame of the mask image (designated as "Pixel_Value_M"). At block 408, the compiler module 126 determines a value of a corresponding pixel of a corresponding frame of the size-adjusted combined asset using a combination of Pixel_Value_A, Pixel_Value_C, and Pixel_Value_M. In an example, the combination can be determined as Pixel_Value_A+Pixel_Value_C*(Pixel_Value_M/255); where Pixel_Value_A, Pixel_Value_C, and Pixel_Value_M contain an array of three pixel values from 0 to 255 (for each channel). At block 410, the compiler module 126 determines whether there are further pixels in the frame of the size-adjusted combined asset for which a value is yet to be determined; and if so, the compiler module 126 repeats blocks 402 to 408 for the next yet to be determined pixel. At block 412, the compiler module 126 determines whether there are further frames of the size-adjusted combined asset for which pixel values have yet to be determined; and if so, the compiler module 126 repeats blocks 402 to 408 for a first pixel of the yet to be determined frame.

The size-adjusted combined asset, generated in accordance with method 400, can be used to generate a new video stream (which may also be thought of as a combined output) which advantageously combines the 4-channel output of the asset on top of the 3-channel source video. In some cases, the size-adjusted combined asset can be displayed, as is, by a video player without need for further decoding.

In some cases, the combined asset, or size-adjusted combined asset, can be delivered for display or storage to, for example, the output interface 108, the network interface 110, or the database 116. In some cases, this can include streaming the combined asset to a user over an online video interface, such as through an Internet browser.

In some embodiments, the decoding module 128 can decode the combined asset in order to output the transparent asset.

At block 314, for each frame of the combined asset, the decoding module 128 generates an output frame with the same width but half the height of the combined asset (as the combined asset includes the content image stacked on the mask image). The output frame has four channels: red, green, blue, and transparent.

At block 316, for each frame of the combined asset, the decoding module 128 splits the frame into a 'first portion' and a 'second portion'. Splitting the frames in this manner can generate a first portion in each sequential frame and a second portion in each sequential frame. The first portion includes the area of the frame of the combined asset comprising the content image, and the second portion includes the area comprising the mask image. For the vertically-stacked orientation, the top-left pixel of the frame (0,0) is the top-left pixel of the content image. The top-left pixel divided by half the height (0, combined image height/2) is the top-left pixel of the mask image.

At block 318, for each pixel in the first portion, the decoding module 128 sets a corresponding pixel in each of the red, green, and blue channels of the output frame with the corresponding values of the red, green, and blue channels of each pixel of the first portion.

At block 320, for each pixel in the second portion, the decoding module 128 sets each pixel of the transparent channel of the output frame with the corresponding value of one of the channels of the mask image; for example, the red channel. Since the mask frame contains the original asset's alpha channel value and all three RGB channels are set for the corresponding pixel, the decoding module 128 can select any of the red, green, or blue channels to retrieve the original asset's transparency-alpha channel value.

The decoding module 128 can, by setting the pixel values in the first portion and the second portion, generate one or more sequential output frames for an output asset.

At block 322, in order to create an output asset, the decoding module 128 sets the duration of each of the output frames as the duration for the corresponding frame from the combined asset. Accordingly, each frame in the combined asset may have an associated duration, and each output frame may have an associated duration equivalent to the associated duration of the respective frame in the combined asset.

In some cases, the output asset can be delivered for display or storage to, for example, the output interface 108, the network interface 110, or the database 116. In some cases, this can include overlaying the output asset on top of other static or dynamic graphical elements; for example, a source video or parts of a webpage.

Figure 6:
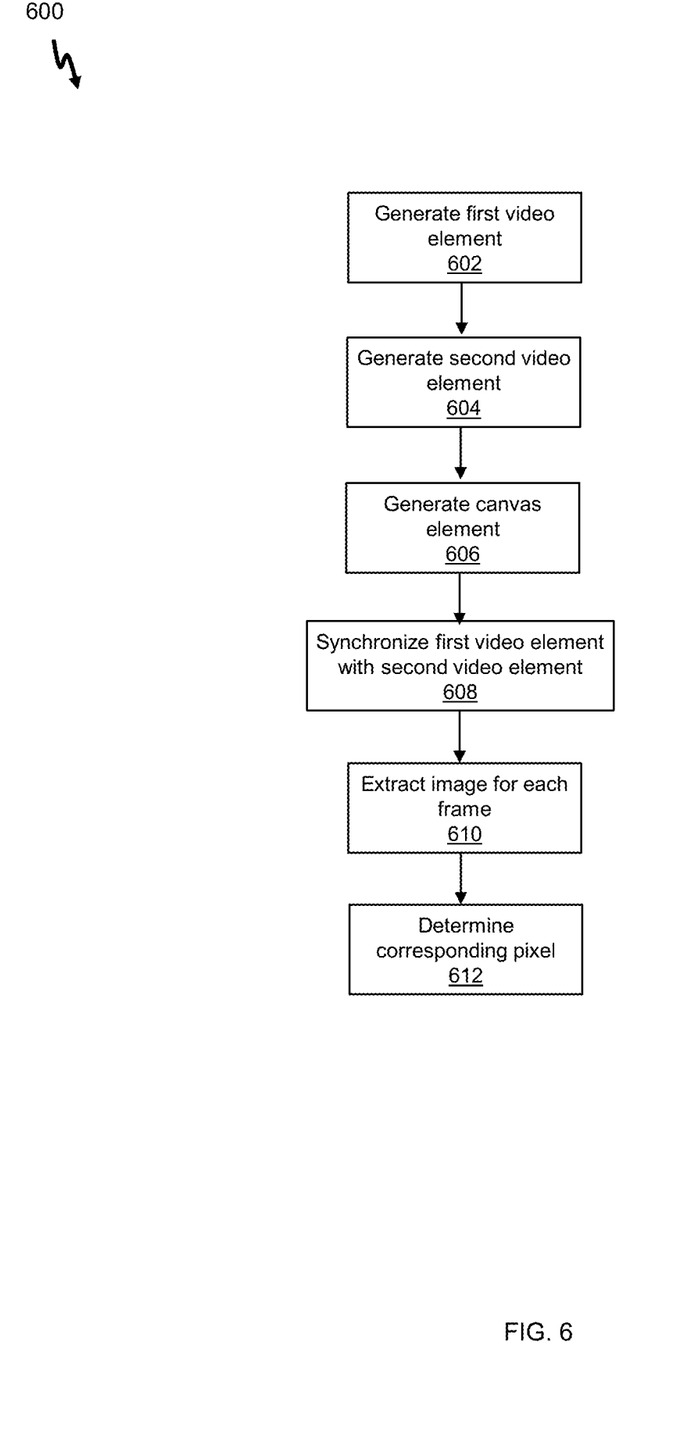
FIG. 6 is a flow chart for a method of overlaying an asset having transparency onto a source video, according to the system of FIG. 1.

In an embodiment of method 300, FIG. 6 illustrates a method 600 of overlaying an asset having transparency, assembled into a combined asset as described above, onto a source video. The source video may comprise one or more sequential frames. In an example, the method 600 is executed in an Internet browser; however, any suitable software is contemplated.

At block 602, the compiler module 126 generates a first video element within the browser with the source video as its source. At block 604, the compiler module 126 generates a second video element within the browser with the combined asset, as described with respect to block 312 above, as its source. The second video element is hidden from display to a user.

At block 606, the compiler module 126 generates a canvas element within the browser with the same size as the first video element. This canvas element is transparent by default and placed over top of the first video element.

At block 608, the compiler module 126 synchronizes the playback, including any pausing, of the second video element with the first video element by following the first video element's play and pause events, and passing them to the second video element.

At block 610, for each frame of the first video element, the compiler module 126 extracts an image of the frame. For each pixel in the image, the compiler module 126 obtains the respective values of the corresponding pixel in the content image ("Pixel_Value_C") and the mask image ("Pixel_Value_M"). At block 612, the compiler module 126 determines a corresponding output pixel in the canvas element as a combination of the value of the corresponding pixel in the content image and the mask image. In a particular case, the combination is determined as: the red channel of the output pixel is equal to the red channel value of Pixel_Value_C, the blue channel of the output pixel is equal to the blue channel value of Pixel_Value_C, the green channel of the output pixel is equal to the green channel value of Pixel_Value_C, and the transparent channel of the output pixel is equal to the red channel value of Pixel_Value_M. In further cases, the transparent channel of the output pixel can be equal to the green or blue channel value of Pixel_Value_M.

In effect, the compiler module 126 uses the canvas element to generate a transparent image overlaid onto the source video. Since the canvas element and source video are overlaid, the browser (in this case) can automatically blend them.

In a further embodiment, where the software, such as an Internet browser, supports WebGL™, blocks 610 and 612 can be implemented using a WebGL™ fragment shader. In some cases, the fragment shader can be executed on a graphics processing unit (GPU) for each frame and for each pixel. Using the WebGL™ fragment shader can make for a better viewing experience because decoding can be offloaded from the CPU; which can be occupied for laying out other elements within the browser.

As an example, the following is an exemplary use of the fragment shader as contemplated herein:

```
precision mediump float;
uniform sampler2D textureV;
varying vec2 texCoord;
void main( ) {
    vec2 coord = texCoord * vec2(1, 0.5);
    vec4 rgba = texture2D(textureV, coord);
    float yhalf = texture2D(textureV, coord + vec2(0, 0.5)).r;
    gl_FragColor = vec4(rgba.rgb, yhalf);
}
```

Advantageously, the source video described in block 602 can be replaced with any software element or browser element; for example, an image or part of a web page. Thus, the effect is that the embodiments described herein can be used to, such as in a browser, to blend a transparent video on top of almost any element.

Figure 7:
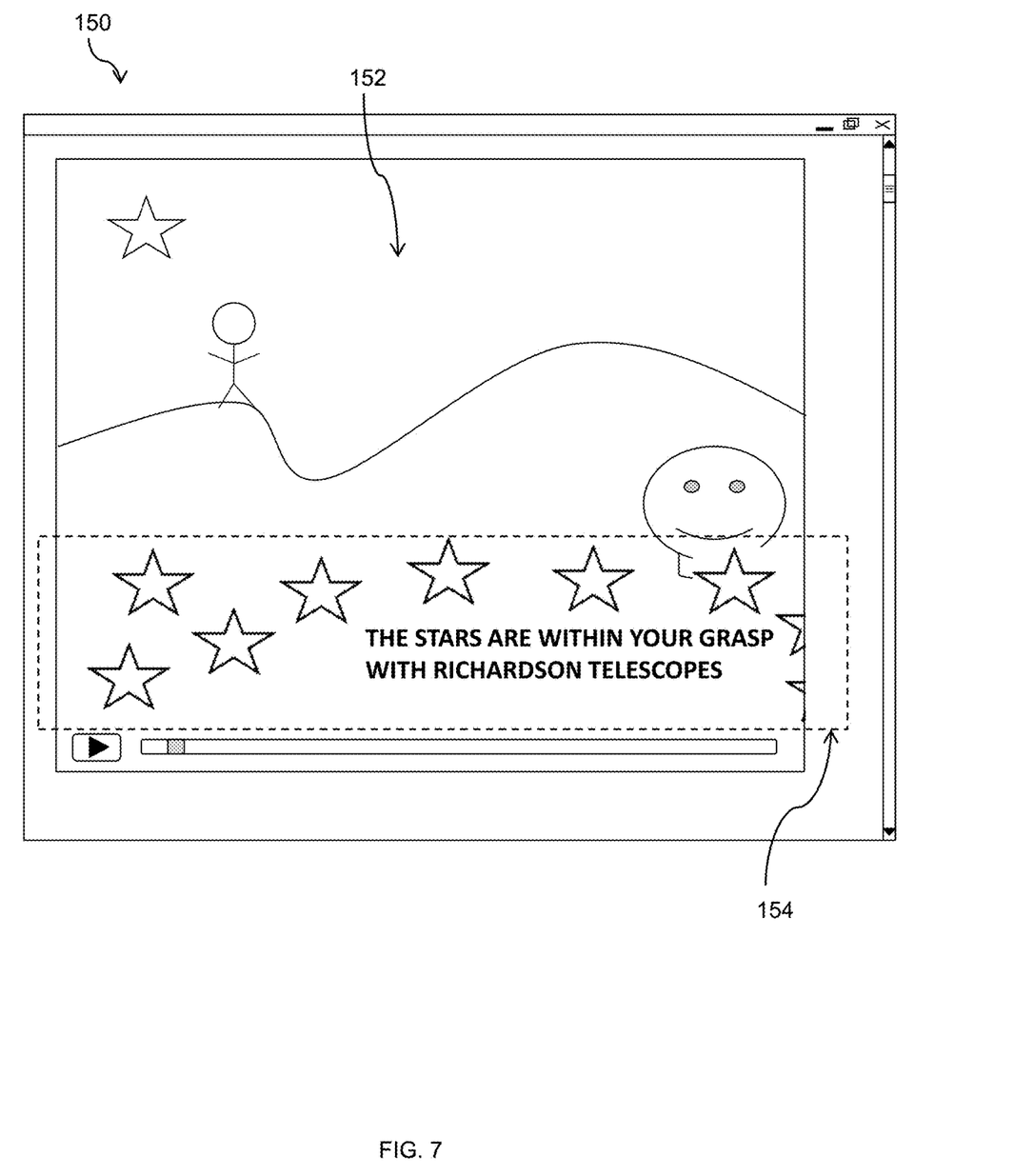
FIG. 7 illustrates a frame of a video with an inserted asset having transparency, according to the system of FIG. 1.

For an exemplary illustration of an asset having transparency overlaid onto a source video, an example frame 150 from a video with an overlaid asset is shown in FIG. 7. The asset 154 (outlined by a dotted line for illustrative purposes)

is shown overlaid on the source video 152, maintaining appropriate transparency, such that the rest of the source video 152 remains unobstructed.

Figures 5A, 5B, 5C:
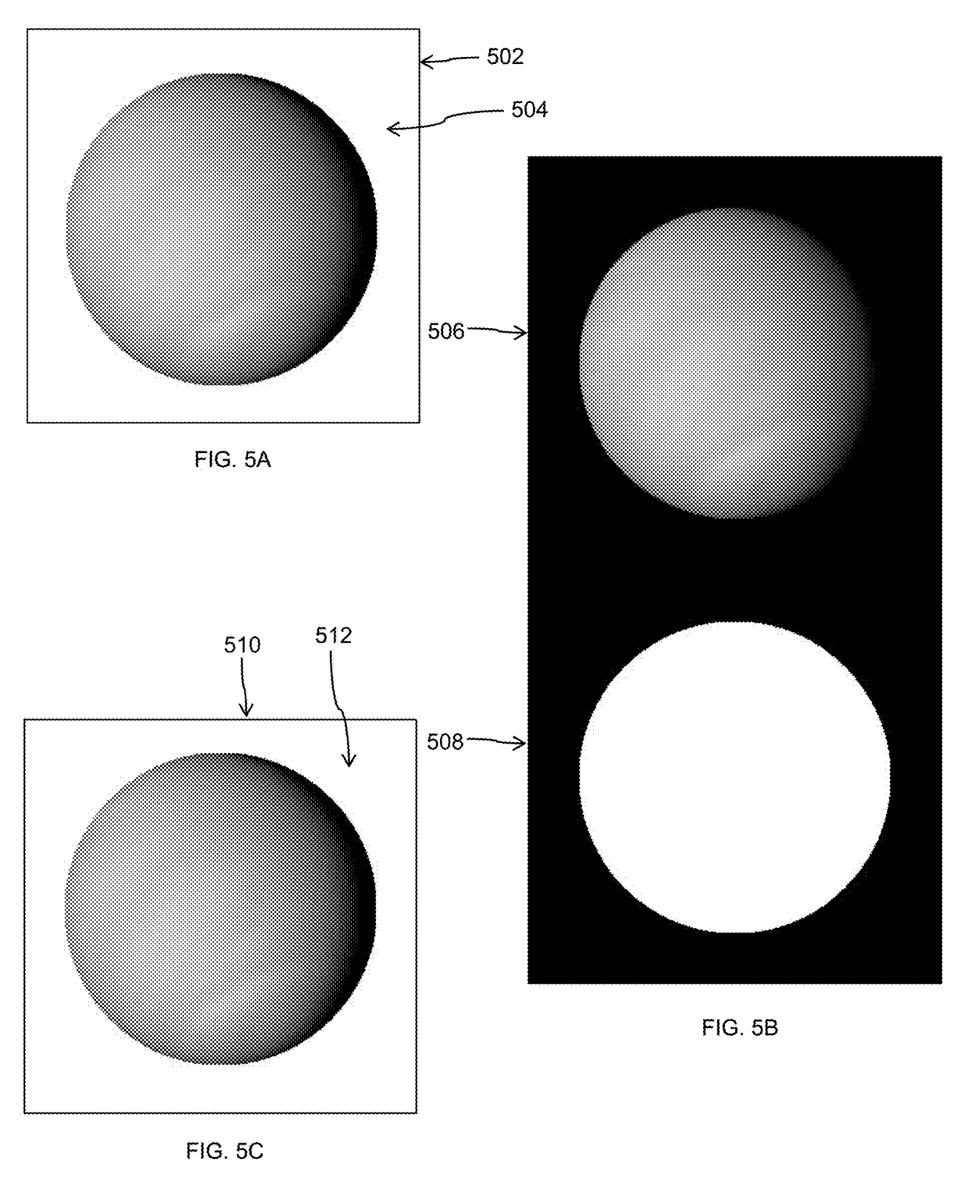
FIG. 5A illustrates an exemplary frame image, having transparency areas, according to the system of FIG. 1.
FIG. 5B illustrates an exemplary content image vertically stacked on an exemplary mask image, according to the system of FIG. 1.
FIG. 5C illustrates an exemplary output frame, having transparency areas, according to the system of FIG. 1.

FIGS. 5A to 5C illustrate an example of various stages of method 300. FIG. 5A illustrates a frame image 502 having transparency areas 504. FIG. 5B illustrates a content image 506 vertically stacked on a mask image 508. FIG. 5C illustrates an output frame 510, after decoding, having transparency areas 512.

Applicant recognized the substantial advantages of the embodiments described herein. As an example, not all software, for example Internet browsers, can render or decode alpha-enabled video format. As such, the embodiments described herein advantageously allow for the carrying of the transparency information in an opaque video format that most software, such as an Internet browser, can decode (possibly in hardware). Additionally, advantageously, the original asset's frame's RGBA value can be retrieved back; for example, to allow for a recreation of such frame onto an HTML video canvas having transparency.

The embodiments described herein advantageously allow for communicating a 4-channel video (with transparency) over a 3-channel video (without transparency) architecture, and then allowing the decoding back into the original 4-channel video.

Though the above has generally been described in relation to an advertisement for insertion to a source video, it should be generally understood that the inserted assets may not be an advertisement, and can have any content and comprise any suitable media elements; for example, a video, dynamic image, animation, static image, text block, coded page, or the like. Additionally, though the above has generally been described with the RGB and RGBA color models, any suitable color model can be used as appropriate. It should also be generally understood that the assets may be inserted to other suitable source media that have one or more sequential frames; for example, a video, dynamic image, animation, static image, text block, coded page, or the like.

While the above generally describes the asset as a video, it is contemplated that the asset can be a single image and can thus be treated equivalent to a one-frame video in compliance with the embodiments described herein.

Although the invention has been described with reference to certain specific embodiments, various modifications thereof will be apparent to those skilled in the art without departing from the spirit and scope of the invention as outlined in the claims appended hereto.

The invention claimed is:

1. A method for coding of an input asset, the input asset having at least one area comprising a transparency, the input asset comprising one or more sequential frames, the method executed on at least one processing unit, the method comprising:
   receiving the input asset;
   obtaining a frame image for each frame in the input asset, the frame image having a value for each of a red channel, a green channel, a blue channel, and a transparent channel;
   generating a first sub-image and a second sub-image from each frame image, the first sub-image comprising a mask generated from the transparent channel, the second sub-image comprising a red channel, a green channel, and a blue channel generated from the red channel, the green channel, and the blue channel of the frame image respectively, the first sub-image is generated by assigning, for each pixel, the value for such pixel in the transparent channel to the value for a respective pixel in at least one of the red channel, green channel, and blue channel of the mask;
   associating the first sub-image with the second sub-image; and
   generating a combined asset comprising one or more sequential combined frames, each combined frame comprising the first sub-image in association with the second sub-image.

2. The method of claim 1, wherein the associating the first sub-image with the second sub-image comprises placing the first sub-image in proximity to the second sub-image.

3. The method of claim 2, wherein the value of each channel for each pixel in the mask ranges from zero to a maximum value, where zero represents full transparency and the maximum value represents no transparency.

4. The method of claim 2, wherein placing the first sub-image in proximity to the second sub-image comprises stacking the first sub-image adjacently above the second sub-image, the width of the combined frame being equal to a width of the first sub-image and the height of the combined frame being equal to twice a height of the first sub-image.

5. The method of claim 2, wherein each frame in the input asset comprises an associated duration, the method further comprising associating a duration for each combined frame equivalent to the duration associated with the respective frame in the input asset.

6. The method of claim 2, further comprising decoding of the combined asset, the decoding comprising:
   generating one or more sequential first portions and one or more sequential second portions by splitting each combined frame, the first portion comprising the first sub-image, the second portion comprising the second sub-image;
   generating one or more sequential output frames in an output asset by:
      for each frame, assigning a value for a red channel, a green channel, and a blue channel for each pixel of the output asset frame with the value of the red channel, the green channel, and the blue channel of the respective pixel in the first portion respectively; and
      for each frame, assigning a value for a transparent channel for each pixel of the output asset frame with the value of a respective pixel in the second portion.

7. The method of claim 6, wherein the value of the transparent channel in the output asset is assigned the value of any one of the red channel, the green channel, and the blue channel in the combined frame that was assigned the value of the transparent channel of the frame image.

8. The method of claim 6, wherein each combined frame comprises an associated duration, the method further comprising associating a duration for each frame of the output asset equivalent to the duration associated with the respective combined frame.

9. The method of claim 1, further comprising overlaying the combined asset over a source media, the source media comprising one or more sequential frames, by:
   generating a first element comprising the source media;
   generating a hidden second element comprising the combined asset;
   generating a canvas element, pixels of the canvas element are transparent as default;
   placing the transparent canvas element over the first element;
   for each frame of the first video element, for each pixel in the second element, determining a value for a corresponding pixel in the canvas element as a combination of channel values of the corresponding pixel in the second sub-image and mask value of the corresponding pixel in the first sub-image; and synchronizing playback of the second video element with the first video element.

10. The method of claim 1, further comprising generating a size-adjusted combined asset from the combined asset, by:

for each red, green, and blue channel in each pixel in each frame of the combined asset, determining a value for a corresponding channel of a corresponding pixel of a corresponding frame of the size-adjusted combined asset as a combination of the value from the input asset, the first sub-image and the second sub-image.

11. The method of claim 10, wherein the combination is determined as the value from the first sub-image divided by the maximum channel value, multiplied by the value from the second sub-image, and added to the value from the input asset.

12. A method for decoding of a combined asset, the combined asset comprising one or more sequential combined frames, each combined frame comprising a first sub-image in proximity to a second sub-image, the method executed on at least one processing unit, the method comprising:

receiving the combined asset;

generating one or more sequential first portions and one or more sequential second portions by splitting each combined frame, the first portion comprising the first sub-image, the second portion comprising the second sub-image; and generating one or more sequential output frames in an output asset by:

for each frame, assigning a value for a red channel, a green channel, and a blue channel for each pixel of the output asset frame with a value of the red channel, the green channel, and the blue channel of a respective pixel in the first portion respectively; and for each frame, assigning a value for a transparent channel for each pixel of the output asset frame with a value of a respective pixel in the second portion, the value of the transparent channel in the output asset is assigned the value of any one of a red channel, a green channel, and a blue channel in the combined frame that was assigned a value of the transparent channel of a frame image of an asset coded into the combined asset.

13. The method of claim 12, wherein each frame in the combined asset comprises an associated duration, the method further comprising associating a duration for each frame of the output asset equivalent to the duration associated with the respective combined frame.

14. A system for coding of an input asset, the input asset having at least one area comprising a transparency, the asset comprising one or more sequential frames, the system comprising at least one processing unit and a data storage, the at least one processing unit in communication with the data storage and configured to execute:

an obtainment module to receive the input asset, and obtain a frame image for each frame in the input asset, the frame image having a value for each of a red channel, a green channel, a blue channel, and a transparent channel;

a coding module to generate a first sub-image and a second sub-image from each frame image, the first sub-image comprising a mask generated from the transparent channel, the second sub-image comprising a red channel, a green channel, and a blue channel generated from the red channel, the green channel, and the blue channel of the frame image respectively, and associate the first sub-image with the second sub-image, the first sub-image is generated by assigning, for each pixel, the value for such pixel in the transparent channel to the value for a respective pixel in at least one of the red channel, green channel, and blue channel of the mask; and a compiler module to generate a combined asset comprising one or more sequential combined frames, each combined frame comprising the first sub-image associated with the second sub-image.

15. The system of claim 14, wherein the first sub-image is associated with the second sub-image by placing the first sub-image in proximity to the second sub-image.

16. The system of claim 15, further comprising a decoding module to decode the combined asset, by:

generating one or more sequential first portions and one or more sequential second portions by splitting each combined frame, the first portion comprising the first sub-image, the second portion comprising the second sub-image;

generating one or more sequential output frames in an output asset by:

for each frame, assigning a value for a red channel, a green channel, and a blue channel for each pixel of the output asset frame with the value of the red channel, the green channel, and the blue channel of the respective pixel in the first portion respectively; and for each frame, assigning a value for a transparent channel for each pixel of the output asset frame with the value of a respective pixel in the second portion.

17. The system of claim 15, wherein the compiler module is configured to overlay the combined asset over a source media, the source media comprising one or more sequential frames, by:

generating a first element comprising the source media;

generating a hidden second element comprising the combined asset;

generating a canvas element, pixels of the canvas element are transparent as default;

placing the transparent canvas element over the first element;

synchronizing playback of the second video element with the first video element; and for each frame of the first video element, for each pixel in the second element, determining a value for a corresponding pixel in the canvas element as a combination of channel values of the corresponding pixel in the second sub-image and mask value of the corresponding pixel in the first sub-image.

* * * * *